(No Model.)

J. COWIE.
SAFETY ATTACHMENT FOR ELEVATORS.

No. 406,630. Patented July 9, 1889.

WITNESSES:
Chas. Lurcott
C. Sedgwick

INVENTOR:
J. Cowie
BY Munn & Co.
ATTORNEYS.

UNITED STATES PATENT OFFICE.

JAMES COWIE, OF LEISENRING, PENNSYLVANIA.

SAFETY ATTACHMENT FOR ELEVATORS.

SPECIFICATION forming part of Letters Patent No. 406,630, dated July 9, 1889.

Application filed February 27, 1889. Serial No. 301,337. (No model.)

*To all whom it may concern:*

Be it known that I, JAMES COWIE, of Leisenring, in the county of Fayette and State of Pennsylvania, have invented a new and Improved Safety Attachment for Elevators, of which the following is a full, clear, and exact description.

This invention relates to safety attachments for elevators, the object of the invention being to provide an attachment by means of which accidents owing to the overwinding of the cage-suspending rope will be avoided; and to the end named the invention consists in the construction and arrangement of parts, all as will be hereinafter more fully explained, and specifically pointed out in the claim.

Reference is to be had to the accompanying drawings, forming a part of this specification, in which similar figures and letters of reference indicate corresponding parts in both the views.

Figure 1:
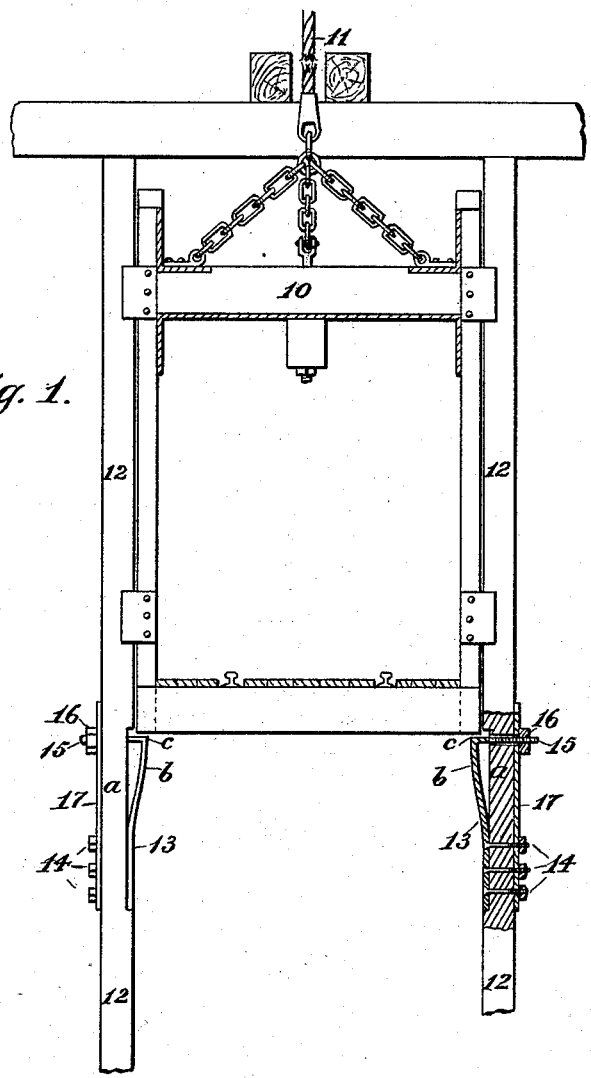
Figure 2:
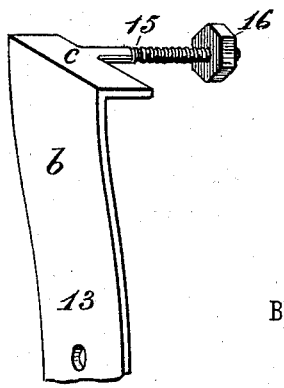

Figure 1 is a side view of a cage and its guides, representing the same as they appear when provided with my safety attachment, parts being broken away; and Fig. 2 is a perspective view of a portion of one of the sustaining-springs.

In the drawings, 10 represents a cage, and 11 the rope by which said cage is suspended, such rope being carried, as usual, to a winding-drum. (Not shown in the drawings.) The cage 10 runs between guides 12, and the inner faces of these guides are each recessed at *a*. In the recesses so formed I mount springs 13, said springs being bolted to the guides by bolts 14.

The upper end of each spring is bent to form a reverse curve, as indicated, and above the curves (which are shown at *b*) the springs are bent so as to extend at right angles, thus forming shoulders *c*. Threaded shanks 15 extend outward from the horizontal sections of the springs, and these shanks are engaged by nuts 16, which bear against wear-plates 17, that are secured to the outer faces of the guides, the bolts 14 also passing through these wear-plates. The location of the springs 13 is such that the bottom of the cage 10 would not ordinarily pass above the spring-shoulders; but should the suspension-rope 11 be over-wound the cage might be carried above the springs, and in case the rope broke any downward movement of the cage would be checked by the springs, and consequently accidents would be avoided. After the rope 11 has been repaired the springs 13 may be drawn so that they will rest within the recesses *a* by turning the nuts 16, as will be readily understood.

I am aware that elevator-cages have been provided with dogs arranged to engage their guides, and I make no claim to such construction; but such dogs are liable to become broken in case of the overwinding of the suspending-rope, and frequently fail to act.

Having thus described my invention, I claim as new and desire to secure by Letters Patent—

The combination, with an elevator-cage and its guides, of springs connected to the guides and formed with shoulders, and with outwardly-extending threaded shanks connected to the springs, and nuts which engage said shanks, substantially as described.

JAMES COWIE.

Witnesses:
 JOHN L. GANS,
 JOHN KURTZ.